United States Patent [19]
Yajima

[11] Patent Number: 5,672,437
[45] Date of Patent: Sep. 30, 1997

[54] SOLID ELECTROLYTE FOR A FUEL CELL

[75] Inventor: Tamotsu Yajima, Gifu-ken, Japan

[73] Assignee: Tokyo Yogyo, Kabusiki Kaisha, Gifu-ken, Japan

[21] Appl. No.: 461,497

[22] Filed: Jun. 5, 1995

[30] Foreign Application Priority Data

Feb. 9, 1995 [JP] Japan .................... 7-043666
Feb. 14, 1995 [JP] Japan .................... 7-047918

[51] Int. Cl.$^6$ ........................................ H01M 8/10
[52] U.S. Cl. ............. 429/33; 427/126.3; 427/372.2; 429/193
[58] Field of Search ................. 429/30, 33, 193; 204/421–429

[56] References Cited

U.S. PATENT DOCUMENTS

| | | | |
|---|---|---|---|
| 4,562,124 | 12/1985 | Ruka | 429/33 |
| 5,234,722 | 8/1993 | Ito et al. | 429/33 |
| 5,350,641 | 9/1994 | Mogensen et al. | 429/33 |
| 5,378,345 | 1/1995 | Taylor et al. | 204/421 |
| 5,387,330 | 2/1995 | Taniguchi et al. | 204/421 |
| 5,393,397 | 2/1995 | Fukaya et al. | 204/424 |
| 5,403,461 | 4/1995 | Tuller et al. | 429/33 |

*Primary Examiner*—T. Tung
*Attorney, Agent, or Firm*—Michael J. Kline; Carol I. Bordas; Noland J. Cheung

[57] ABSTRACT

The present invention relates to a solid electrolyte consisting essentially of cerium oxide for a fuel cell. In addition, this solid electrolyte is prevented from becoming reduced under the effect of a fuel gas of a fuel cell. The present invention also relates to a method for producing this solid electrolyte and to a high-temperature-type fuel cell utilizing this solid electrolyte. This solid electrolyte for a fuel cell comprises:

(a) a specifically-shaped solid electrolyte consisting essentially of cerium oxide; the solid electrolyte having a fluorite-type structure and oxide-ionic conduction; and (b) a perovskite-type oxide having an $ABO_3$-type composition, which is a solid electrolyte of proton/oxide-ionic mixed conduction and is bonded as a membrane on a part of the surface of the solid electrolyte consisting essentially of cerium oxide, in which (i) A of the "$ABO_3$" represents at least one element selected from the group consisting of alkaline earth metals; and (ii) B of the "$ABO_3$" represents cerium by itself or cerium having at least one element selected from the group consisting of alkaline earth metals and rare earth elements, the elements selected from alkaline earth metals and rare earth elements substituting the cerium by 1 to 30 mol %.

A fuel cell comprising the above mentioned solid electrolyte shows excellent high-temperature characteristics.

6 Claims, 4 Drawing Sheets

SOLID ELECTROLYTE FOR A FUEL CELL

FIELD OF THE INVENTION

The present invention relates to a solid elect for a fuel cell. This solid electrolyte comprise a solid electrolyte of oxide-ionic conduction which consists essentially of cerium oxide and a membrane of solid electrolyte of proton/oxide-ionic mixed conduction bonded on a solid electrolyte of oxide-ionic conduction.

BACKGROUND AND DESCRIPTION OF THE PRIOR ART

A most frequently used material of a solid electrolyte for a high-temperature-type fuel cell is zirconia stabilized with yttrium oxide. However, in order to obtain higher electric output characteristics of the cell, a solid electrolyte of higher ionic conductivity has been demanded.

A solid electrolyte consisting essentially of cerium oxide can be used in place of a stabilized-zirconia electrolyte. However, if the fuel gas fed on its anode's side is $H_2$, $CH_4$ or the like, the cerium oxide contained in the electrolyte may be partially reduced under the effect of the fuel gas at its operating temperature, which can present a problem of a decrease in terminal voltage. The above-mentioned problem can be solved by bonding a thin membrane of stabilized zirconia on the anode's side surface of the cerium oxide electrolyte. Chemical vapor deposition (CVD), electro-chemical deposition (EVD), thermal spraying and the like have been proposed as a method for forming the thin membrane of stabilized zirconia (See, for example, *The Extended Abstracts of The 14th Symposium on Solid State Ionics in Japan*, Nov. 12–13, 1987, The Solid State Ionics Society of Japan). These methods, nevertheless, have disadvantages such as high production costs due to extensive production facilities, complex production processes and the like.

SUMMARY OF INVENTION

The object of the present invention is to provide a solid electrolyte of proton/oxide-ionic mixed conduction on the anode's side surface of a solid electrolyte consisting essentially of cerium oxide in such a manner that a high degree of adhesiveness can be achieved between these electrolytes. In addition, this bonding can be performed inexpensively and easily.

A further object of the present invention is to provide a fuel cell which utilizes the above-mentioned solid electrolyte.

Various experiments and research were carried out to develop a solid electrolyte for a fuel cell, which comprises a close and highly adhesive solid electrolyte of proton/oxide-ionic mixed conduction bonded on one surface of a cerium-oxide-based solid electrolyte of oxide-ionic conduction and a method for producing this solid electrolyte for a fuel cell.

As a result, it was found that a solid electrolyte for a fuel cell which comprises a solid electrolyte of proton/oxide-ionic mixed conduction bonded on the surface of a solid electrolyte of oxide-ionic conduction can be easily obtained by coating at least one material selected from the inorganic acid salts, organic acid salts and organic metal compounds of the alkaline earth metals, which are the elements composing the solid electrolyte of proton/oxide-ionic mixed conduction on the surface of a solid electrolyte consisting essentially of cerium oxide, and causing a reaction between the alkaline earth metal compounds and the solid electrolyte of oxide-ionic conduction in an oxidizing atmosphere at a temperature higher than 800° C. The present invention described hereinafter is based on this finding.

According to a first aspect of the present invention, we provide a solid electrolyte for a fuel cell comprising:
  (a) a specifically-shaped solid electrolyte consisting essentially of cerium oxide, the solid electrolyte having a fluorite-type structure and oxide-ionic conduction, and
  (b) a membrane of a perovskite-type oxide having an $ABO_3$-type composition, which is a solid electrolyte of proton/oxide-ionic mixed conduction being bonded on a part of the surface of the solid electrolyte consisting essentially of cerium oxide, in which
    (i) A of "$ABO_3$" represents at least one element selected from a group consisting of alkaline earth metals (Mg, Sr, Ca, Ba),
    (ii) B of "$ABO_3$" represents cerium by itself or cerium having at least one element selected from a group consisting of alkaline earth metals (Mg, Sr, Ca, Ba) and rare earth elements (Sc, Y, La, Nd, Sm, Eu, Gd, Dy, Ho, Yb); the elements selected from alkaline earth metals and rare earth elements substituting the cerium by 1 to 30 mol %.

According to a second aspect of the present invention, we provide a method for producing such a solid electrolyte for a fuel cell comprising the steps of:
  (a) preparing a specifically-shaped solid electrolyte consisting essentially of cerium oxide which has a fluorite-type structure and oxide-ionic conduction,
  (b) coating at least one material selected from the inorganic salts, organic acid salts and organic metal compounds of alkaline earth metals (Mg, Sr, Ca, Ba) on a part of the surface of the solid electrolyte consisting essentially of cerium oxide, and
  (c) heating the solid electrolyte thus coated to a temperature higher than 800° C. in an oxidizing atmosphere to form a solid electrolyte membrane of proton/oxide-ionic mixed conduction on the surface of the solid electrolyte consisting essentially of cerium oxide.

According to a third aspect of the present invention, we provide a solid electrolyte fuel cell comprising:
  (a) a specifically-shaped solid electrolyte consisting essentially of cerium oxide, the solid electrolyte having a fluorite-type structure and oxide-ionic conduction;
  (b) an anode side of the solid electrolyte being composed of a perovskite-type oxide which consists essentially of oxides of alkaline earth metals and cerium oxide having proton/oxide-ionic mixed conduction, and an anode which is made of sintered Ni paste or Pt paste formed on the fuel side of said anode side of the solid electrolyte; and
  (c) a cathode of the solid electrolyte being made of a perovskite-type rare earth metal oxide.

DETAILED DESCRIPTION OF THE INVENTION

Figure 1:
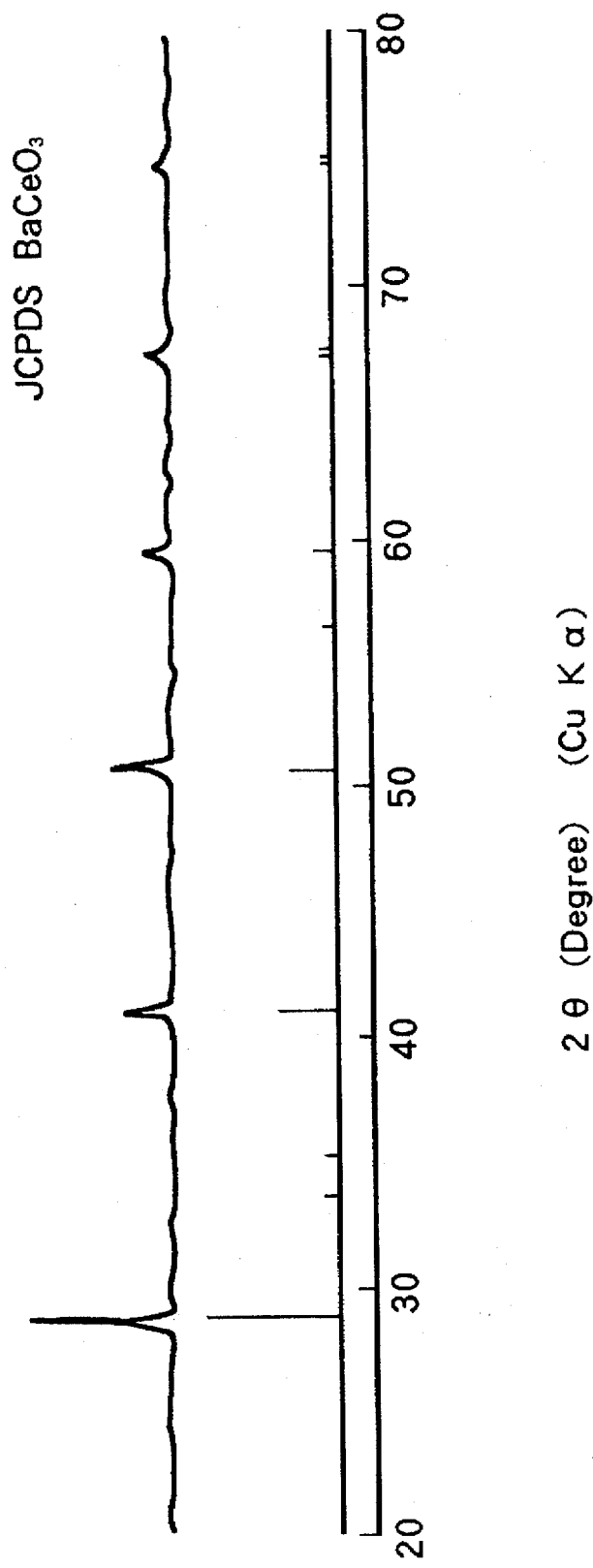
FIG. 1 is an X-ray diffraction pattern of the surface of a solid electrolyte which was obtained by coating saturated aqueous barium nitrate on the surface of disk-like close sintered-body based on cerium oxide which is a solid solution containing 20 mol % of $YO_{1.5}$, drying the solid electrolyte thus coated, and firing it at 1300° C. for 10 hours in air.

In accordance with the present invention, a specifically-shaped solid electrolyte consisting essentially of cerium oxide is used as a solid electrolyte of oxide-ionic conduction having suitable operating properties in a high temperature environment. The shape of this solid electrolyte may be either plate-like or cylindrical according to a required shape for a fuel cell.

It is preferable to use a cerium-oxide solid solution, which contains 1 to 30 mol % of at least one oxide selected from the group of alkaline earth metals (Mg, Sr, Ca, Ba) and rare earth elements (Sc, Y, La, Nd, Sm, Eu, Gd, Dy, Ho, Yb) oxide in the above mentioned solid electrolyte, which consists solely or essentially of cerium oxide.

Examples of the solid electrolyte of oxide-ionic conduction includes $(CeO_2)_{0.8}(YO_{1.5})_{0.2}$; $(CeO_2)_{0.9}(SmO_{1.5})_{0.1}$; $(CeO_2)_{0.8}(CaO)_{0.2}$; $(CeO_2)_{0.8}(SrO)_{0.2}$ and the like.

It is possible to form a membrane of an electrolyte of proton/oxide-ionic mixed conduction on the anode-side surface of the above mentioned solid electrolyte of oxide-ionic conduction by coating at least one material selected from the inorganic acid salts, organic acid salts and organic metal compounds of alkaline earth metals on the solid electrolyte, and then heating the solid electrolyte thus coated to a temperature higher than 800° C. in an oxidizing atmosphere (for example, ambient air). This makes it possible to prevent the cerium-oxide contained in the solid electrolyte from being reduced under the effect of fuel gas. If the heating temperature is lower than 800° C., an appropriate electrolyte of proton/oxide-ionic mixed conduction cannot be obtained.

Examples of the methods for coating at least one material selected from the inorganic acid salts, organic acid salts and organic metal compounds of alkaline earth metals include:

(1) a method comprising the steps of coating saturated aqueous nitrate of an alkaline earth metal uniformly on the surface of an oxide-ionic conductor consisting essentially of cerium oxide with the use of a brush or the like and drying the conductor thus coated;

(2) a method comprising the steps of grinding the carbonate of an alkaline earth metal, mixing this carbonate powder with a volatile solvent (for example, ethanol) to put it into a paste form, coating it uniformly on the surface of an oxide-ionic conductor consisting essentially of cerium oxide with the use of a screen printing machine, and drying the conductor thus coated; and (3) a method comprising the steps of mixing fine powder of the nitrate, carbonate or the like of an alkaline earth metal with a solvent such as water or ethanol to yield slip, and coating the slip on an oxide-ionic conductor consisting essentially of cerium oxide by soaking the oxide-ionic conductor in the slip and quickly pulling out the conductor from the slip.

These methods make it possible to form an electrolyte membrane of proton/oxide-ionic mixed conduction on the above-mentioned solid electrolyte. This electrolyte of proton/oxide-ionic mixed conduction is a perovskite-type oxide having an $ABO_3$-type composition. A of the "$ABO_3$" represents at least one element selected from the group consisting of alkaline earth metals (Mg, Sr, Ca, Ba), and B of the "$ABO_3$" represents at least one element selected from rare earth elements and the like, more specifically, cerium by itself or cerium having at least one element selected from a group consisting of alkaline earth metals (Mg, Sr, Ca, Ba) and rare earth elements (Sc, Y, La, Nd, Sm, Eu, Gd, Dy, Ho, Yb); the element(s) selected from alkaline earth metals and rare earth elements substituting the cerium by 1 to 30 mol %.

It is possible to add other substances into the above mentioned solid electrolyte as long as the substances to be added do not significantly affect the characteristics of the solid electrolyte. Examples of this solid electrolyte of proton/oxide-ionic mixed conduction include $SrCe_{0.9}Yb_{0.1}O_{3-\alpha}$; $BaCe_{0.8}Y_{0.2}O_{3-\alpha}$ and the like ($\alpha$=about 0 to 0.5).

Furthermore, the thickness of this solid electrolyte of proton/oxide-ionic mixed conduction is preferably 10 μm or more. The thickness less than 10 μm cannot prevent the solid electrolyte of oxide-ionic conduction from being reduced under the influence of the fuel gas which enters into it.

An electrode material such as Ni paste, Pt paste or the like, is applied on the surface of the solid electrolyte of proton/oxide-ionic mixed conduction so that this electrode material can act as an anode of a fuel cell. On the cathode-side surface of the above-mentioned solid electrolyte of oxide-ionic conduction, a material which has a high degree of adhesiveness to the solid electrolyte of oxide-ionic conduction and which forms a cathode, is provided. Examples of this material include well-known, perovskite-type rare earth metal oxide and the like, and more specifically, $La_{0.7}Sr_{0.3}MnO_3$, $Ca_{0.9}Ce_{0.1}MnO_3$, $La_{0.7}Sr_{0.3}CoO_3$ and the like.

An interconnector or a separator which is made of platinum, $La_{0.7}Ca_{0.3}CrO_3$ or a heat resistant alloy, such as inconel and the like, can be connected to the anode and the cathode mentioned above. It is possible to constitute a high-power fuel cell by connecting elementary cells in series or parallel with the use of this interconnector.

It is possible to prevent a solid electrolyte consisting essentially of cerium oxide from being reduced under the influence of a fuel gas such as hydrogen, methane and the like, by bonding a layer of a proton/oxide-ionic mixed conductor on the anode-side surface of the above mentioned oxide-ionic conductor consisting essentially of cerium oxide.

Furthermore, in the cathode's side, the oxide-ionic conductor consisting essentially of cerium oxide has the characteristics that the polarization of its electrode reaction is small on the interface of the electrode, and at the same time, in the anode's side, the proton/oxide-ionic mixed conductor has the characteristics that the polarization of its electrode reaction is small, which makes it possible to obtain a electric high power in the generation of electric current. Thus, it becomes possible to decrease the operating temperature of a fuel cell and to reduce the necessary refractoriness and the like of the composing materials of a fuel cell. Consequently, the production costs of a fuel cell can also be reduced.

EXAMPLE 1

Saturated aqueous barium nitrate was coated on the surface of disk-shaped close sintered-body based on cerium oxide which is a substitutional solid solution containing 20 mol % of $YO_{1.5}$. The sintered-body, thus coated, was then dried, and fired at 1300° C. for 10 hours in air.

FIG. 1 shows an X-ray diffraction pattern of the membrane. This membrane had a diffraction pattern which could be identified as $BaCeO_3$ according to the X-ray diffraction data listed in JCPDS, and was found to be $BaCeO_3$.

Figure 2:
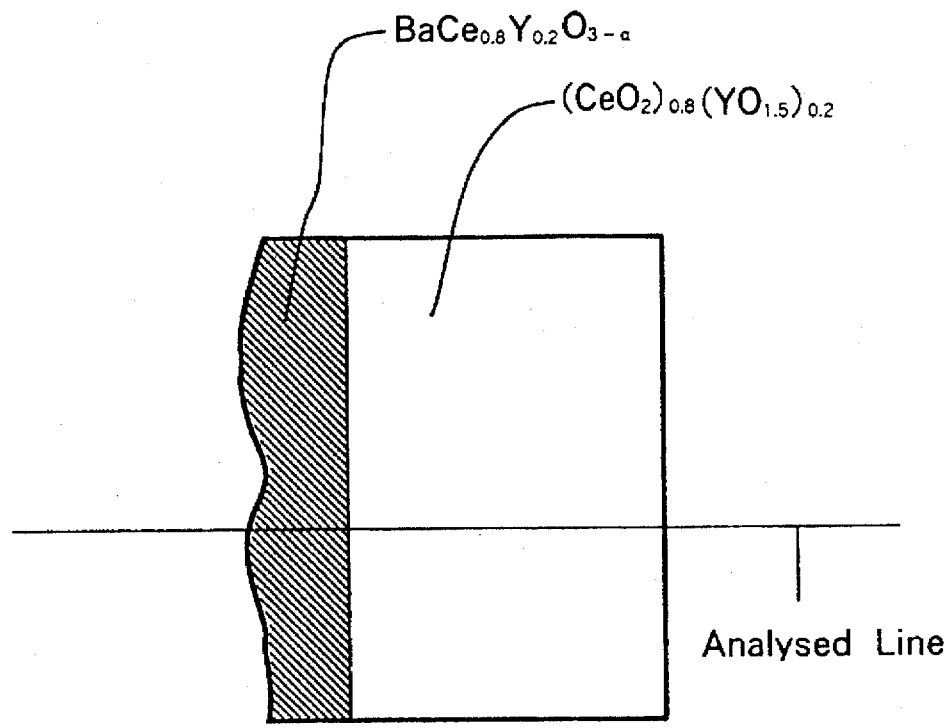
FIG. 2 shows a sectional view of the surface structure of a solid electrolyte which was obtained by coating saturated aqueous barium nitrate on the surface of disk-like close sintered-body based on cerium oxide which is a solid solution containing 20 mol % of $YO_{1.5}$, drying the solid electrolyte thus coated, and firing it at 1300° C. for 10 hours in air.
Figure 2:
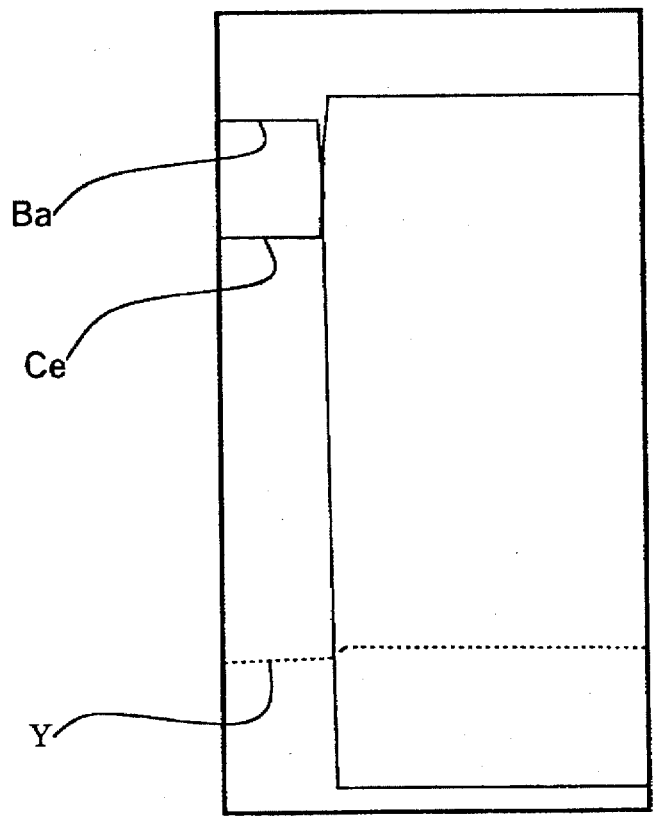

FIG. 2 shows a sectional view of the membrane. The thickness of this membrane was 30 to 40 µm. As a consequence of the EPMA analysis of the Ba, Ce and Y contained in the membrane, it became apparent that the distribution of these elements was uniform and the composition of the membrane obtained was Ba:Ce:Y=1:0.8:0.2. The adhesiveness of the $BaCeO_3$ membrane to the solid solution based on cerium oxide was appropriate and the delamination between them was not observed even after the heat cycle from room temperature to 1000° C. had been repeated 30 times and more.

EXAMPLE 2

Saturated aqueous barium nitrate was coated on the surface of disk-shaped, close sintered-body based on cerium oxide which was a substitutional solid solution containing 20 mol % of $YO_{1.5}$. The sintered-body, thus coated, was then dried, and fired at 1300° C. for 10 hours in air. As a consequence of the X-ray diffraction analysis and the EPMA analysis of the composition of the membrane thus formed, it became apparent that the membrane was a close membrane having the composition of $BaCe_{0.8}Y_{0.2}O_{3-\alpha}$. The thickness of this membrane was 30 to 40 µm.

A fuel cell was composed with the use of the solid electrolyte of oxide-ionic conduction consisting essentially of cerium oxide mentioned above. The paste of $La_{0.7}Sr_{0.3}MnO_3$ was coated on the central area, about 2 cm$^2$, of the surface of this solid electrolyte which was plate-shaped and about 0.4 mm in thickness. The paste of Ni as an anode was coated on the surface of the solid electrolyte of proton/oxide-ionic conduction mentioned above. The Paste of $La_{0.7}Sr_{0.3}MnO_3$ on these solid electrolytes were fired. Thus, a porous electrode was obtained.

Figure 3:
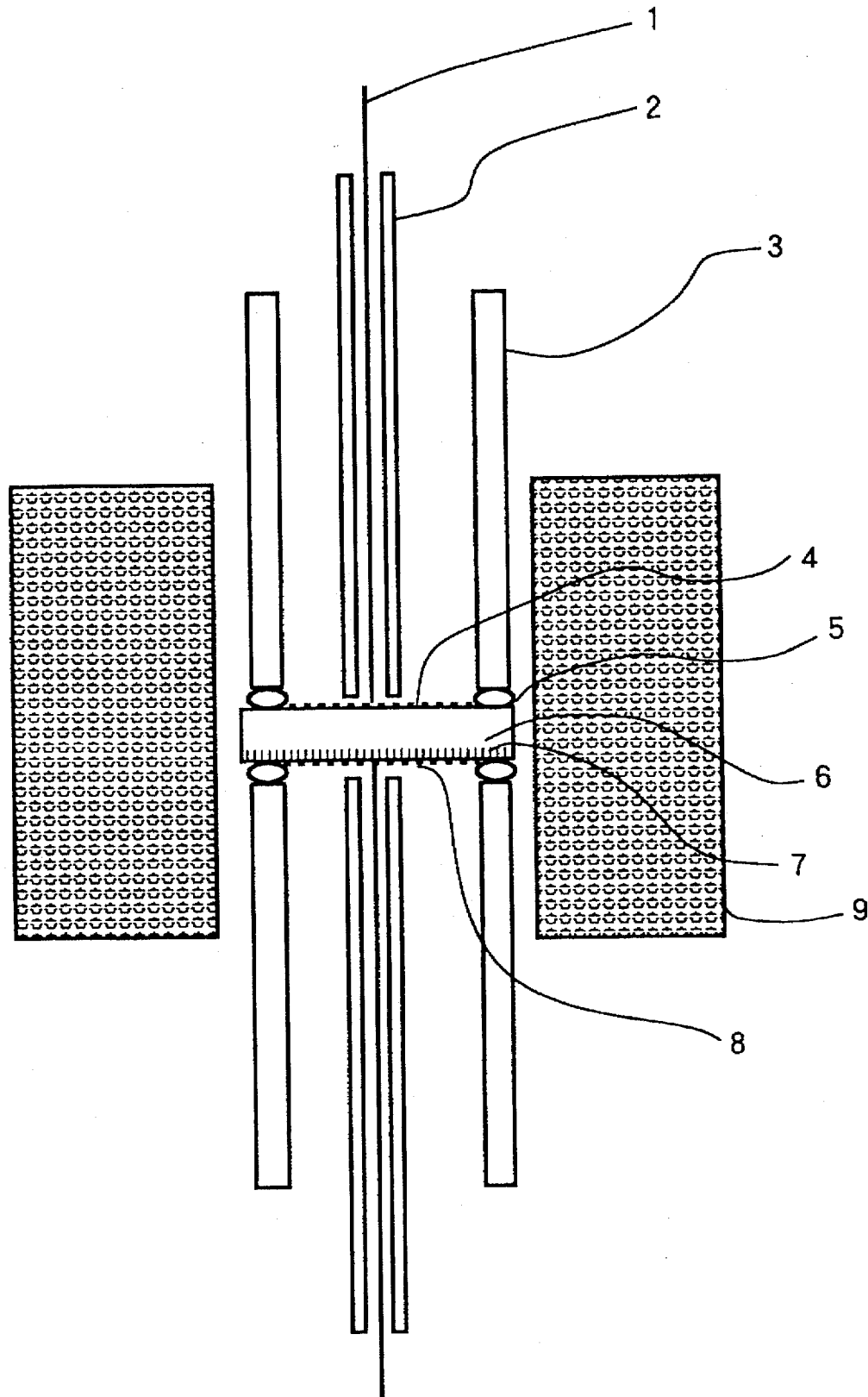
FIG. 3 is a schematic view of a fuel cell according to the present invention.

FIG. 3 shows a fuel cell. As shown in this figure, an alumina pipe 3 was connected to the surface of an electrode 6 with the use of Pyrex glass 5 as a gas seal material. Two alumina tubes 2, each of which contained a platinum wire, were inserted into the alumina pipe 3 in order to form a fuel cell. This fuel cell was placed in an electric furnace 9 and maintained at 1000° C.

Air was introduced into the space 4 located in the side of the cathode ($La_{0.7}Sr_{0.3}MnO_3$), and hydrogen gas was introduced into the space 7 located in the side of the solid electrolyte of proton/oxide-ionic conduction. A Ni electrode 8 was used as an electrode provided for the anode.

Figure 4:
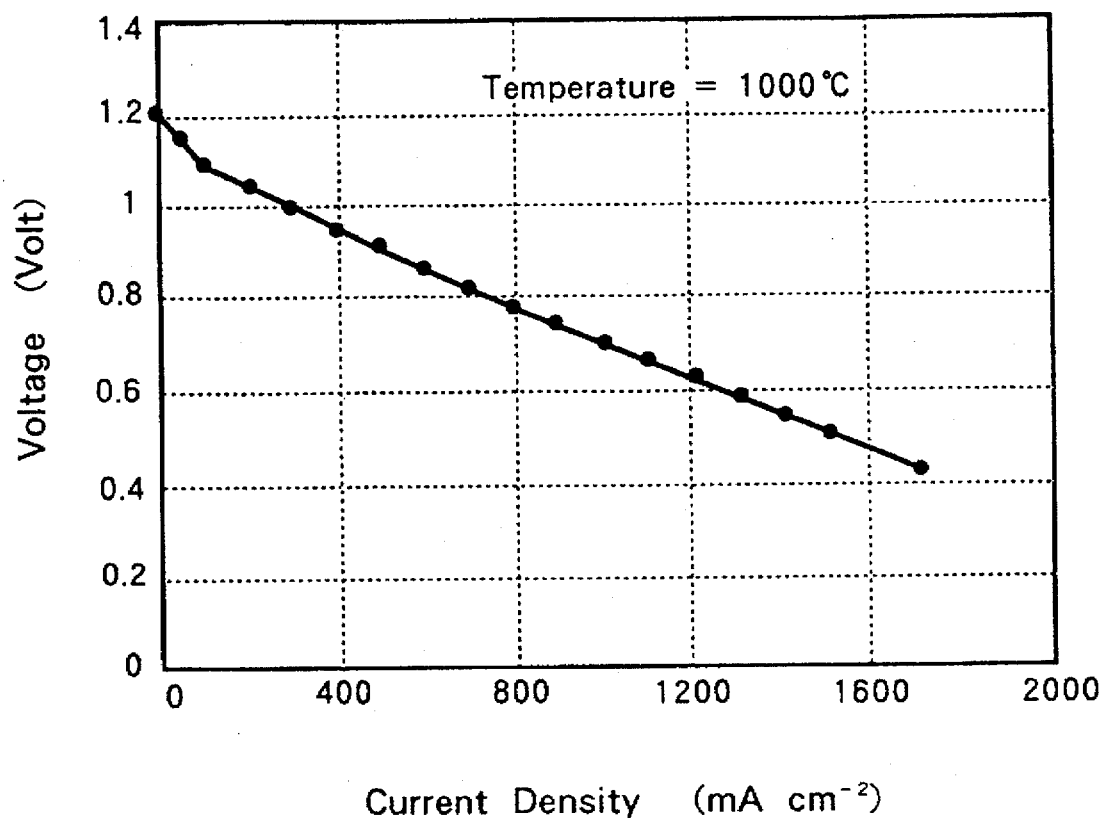
FIG. 4 is a graph showing voltage-current characteristics of a fuel cell according to the present invention.

FIG. 4 shows the voltage-current characteristics of the fuel cell. The measured voltage of this cell generally agreed with the theoretical electromotive force calculated from a theoretical formula and showed that the fuel cell according to the present invention displayed higher non-load voltage than that of a conventional fuel cell.

This showed that the electrolyte, consisting essentially of cerium oxide, was prevented from being reduced under the effect of a fuel gas and the decrease of the non-load voltage of the cell was avoided by depositing a proton/oxide-ionic mixed conductor on one surface of a solid electrolyte consisting essentially of cerium oxide and the use of this ionic mixed conductor on the side of the cell's anode.

Moreover, with regard to the current taken from this fuel cell, it was proven that the polarization at its electrodes was smaller than that of a conventional fuel cell of a stabilized-zirconia type and, therefore, higher power density could be obtained than that of a conventional fuel cell.

Thus, it is possible to inexpensively and easily produce a highly-adhesive membrane of a solid electrolyte of proton/oxide-ionic mixed conduction as a layer bonded on a solid electrolyte consisting essentially of cerium oxide. When the solid electrolyte membrane of proton/oxide-ionic mixed conduction on the side of the cell's anode, this solid electrolyte membrane can prevent the reduction of cerium oxide and can act as an appropriate solid electrolyte for a fuel cell.

A fuel cell, in which the solid electrolyte layer of proton/oxide-ionic mixed conduction in the side of its anode and its cathode is formed on the solid electrolyte of oxide-ionic conduction, can show great advantageous characteristics for a fuel cell.

While we have illustrated and described several embodiments of our invention, it will be understood that these are by way of illustration only and that various changes and modifications may be contemplated in our invention and within the scope of the following claims.

We claim:

1. A solid electrolyte for a fuel cell comprising:
   (a) a specifically-shaped solid electrolyte consisting essentially of cerium oxide having a fluorite-type structure and oxide-ionic conduction; and
   (b) a membrane of a perovskite-type oxide having an $ABO_3$-type composition, which is a solid electrolyte of proton/oxide-ionic mixed conduction, being bonded on a part of a surface of said solid electrolyte consisting essentially of cerium oxide, in which
      (i) A of $ABO_3$ represents at least one element Selected from a group consisting of alkaline earth metals Mg, Sr, Ca and Ba; and
      (ii) B of $ABO_3$ represents cerium by itself or cerium having at-least one element selected from a group consisting of alkaline earth metals Mg, Sr, Ca and Ba and rare earth elements Sc, Y, La, Nd, Sm, Eu, Gd, Dy, Ho and Yb; said elements selected from alkaline earth metals and rare earth elements substituting said cerium by 1 to 30 mol %.

2. The solid electrolyte as defined in claim 1 wherein a portion of said specifically-shaped solid electrolyte consisting essentially of cerium oxide is substituted by at least one oxide of an element selected from a group consisting of alkaline earth metals Mg, Sr, Ca and Ba and rare earth elements Sc, Y, La, Nd, Sm, Eu, Gd, Dy, Ho and Yb by 1 to 30 mol %.

3. A solid electrolyte fuel cell comprising:
   (a) a specifically-shaped solid electrolyte consisting essentially of cerium oxide; said solid electrolyte having a fluorite-type structure and oxide-ionic conduction;
   (b) a membrane of a perovskite-type oxide which consists essentially of oxides of alkaline earth metals and cerium oxide and which has proton/oxide-ionic mixed conduction bonded on a part of a surface of said solid electrolyte;
   (c) a cathode of said solid electrolyte being made of a perovskite-type rare-earth metal oxide; and
   (d) an anode of said solid electrolyte being made of sintered Ni paste or Pt paste formed on said membrane.

4. The solid electrolyte fuel cell as defined in claim 3 wherein a portion of said solid electrolyte consisting essentially of cerium oxide is substituted by at least one oxide of an element selected from a group consisting of alkaline earth metals Mg, Sr, Ca and Ba and rare earth elements Sc, Y, La, Nd, Sm, Eu, Gd, Dy, Ho and Yb by 1 to 30 mol %.

5. The solid electrolyte fuel cell as defined in claim 4 wherein said membrane composed of perovskite-type oxide and having proton/oxide-ionic mixed conduction is a perovskite-type oxide having an $ABO_3$-type composition, in which (a) A of the ABO$_3$ represents at least one element selected from a group consisting of alkaline earth metals Mg, Sr, Ca and Ba;

(b) B of the ABO$_3$ represents cerium by itself or cerium having at least one element selected from a group consisting of alkaline earth metals Mg, Sr, Ca and Ba and rare earth elements Sc, Y, La, Nd, Sm, Eu, Gd, Dy, Ho and Yb; said elements selected from alkaline earth metals and rare earth elements substituting said cerium by 1 to 30 mol %.

6. The solid electrolyte fuel cell as defined in claim 5, wherein said membrane composed of perovskite-type oxide and having said proton/oxide-ionic mixed conduction has a thickness of at least 10 μm.

* * * * *